D. P. JONES.
DEVICE FOR GRIPPING, FASTENING, OR LOCKING PURPOSES.
APPLICATION FILED DEC. 27, 1910.
1,005,227.  Patented Oct. 10, 1911.
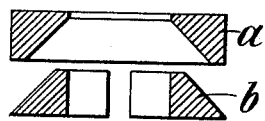
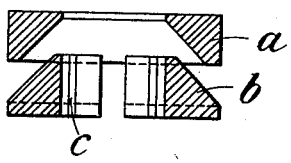
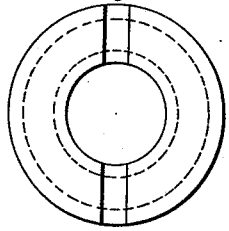
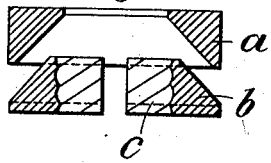
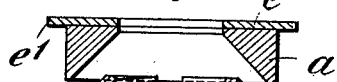
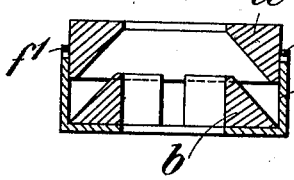
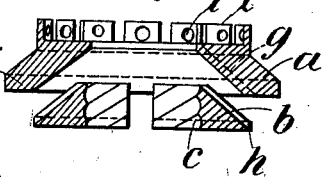
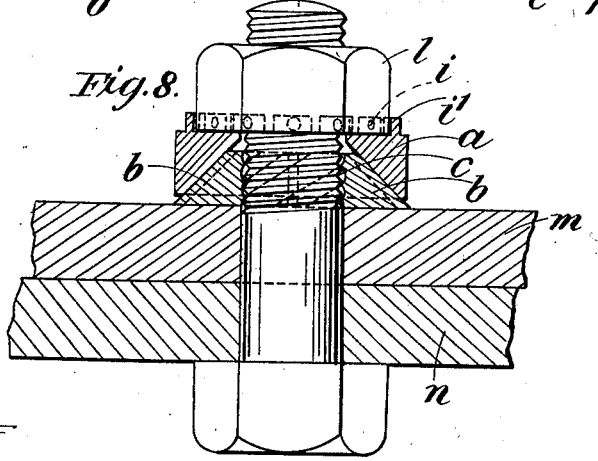
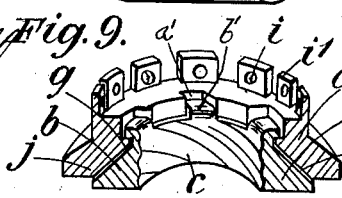
Inventor:
Daniel P. Jones,

UNITED STATES PATENT OFFICE.

DANIEL PALMER JONES, OF WESTMINSTER, LONDON, ENGLAND.

DEVICE FOR GRIPPING, FASTENING, OR LOCKING PURPOSES.

1,005,227. Specification of Letters Patent. Patented Oct. 10, 1911.

Application filed December 27, 1910. Serial No. 599,503.

*To all whom it may concern:*

Be it known that I, DANIEL PALMER JONES, manufacturer, subject of the King of England, residing at 124 Victoria street, Westminster, London, England, have invented certain new and useful Improvements in Devices for Gripping, Fastening, or Locking Purposes, of which the following is a specification.

My invention relates to gripping, fastening or locking devices and has for its object to effect a secure binding or gripping action, or to securely bind together a plurality of parts with a constantly acting grip which does not lose its force by wear, shocks, vibrations or other forces exerted on the parts so held with a tendency to disassemble or loosening them.

More particularly my device is adapted to act as a locking or fastening nut or washer, or in other words to enable any ordinary screw-threaded nut to be locked or to be used in conjunction with this device as a lock nut.

To this end my invention consists of male and female members in the shape of a double washer adapted to coöperate with the part or parts to be locked together, usually called the resistance, and with the screw-threaded nut. These members which I make of resilient material, preferably of spring steel, are so constructed as to be capable of gliding upon one another when subjected to pressure by say an ordinary screw-threaded nut, and on being so pressed together are caused to produce or act with a resilient grip and with a counterforce so directed as to prevent the loosening or unscrewing of the screw-threaded nut or member acting in the opposite direction. The washer members are made in the form of male and female cone members, the male cone being made in two or more parts, and, if desired, provided with internal teeth, or gripping edges, or flutes, milled or otherwise worked into its internal surface, and so positioned therein (with regard, say, to the pitch of a screw bolt to which the device is to be applied) as to cause the screw nut or tightening member to constantly oppose itself to any unscrewing or loosening action. In this way the washer, together with the screw nut, or other tightening member used to exert pressure upon it, forms an absolutely reliable and strong locking or fastening device which can be made for any standard size of screw or other bolt, shaft or member with which it is to coöperate.

I am aware that it has been proposed to use washer-like locking members having conical or oblique surfaces for mutual engagement and I do not claim the use of such washer members of which one or the other or both are provided with screw threads so as to themselves act as a nut by screw action, but where in my device screw-threads are used on any of the parts of the washer, according to this invention, they merely serve as a gripping device in the place of projections, ribs, or like known contrivances.

In order that my invention may be more fully understood reference is made to the accompanying drawings in which:

Figure 1 shows a vertical cross-section and Fig. 2 the corresponding bottom view of a locking washer according to the present invention in its simplest form. Fig. 3 is a similar view in section of a second constructional form wherein the cylindrical inner surfaces of the male cone are provided with vertical projections or teeth. Fig. 4 is a section of a further modification wherein the male cone is provided with obliquely directed grips or teeth. Fig. 5 shows a modified construction wherein the male cone is provided with internal screw threads. Fig. 6 shows the use in connection with the double washer according to this invention of a guide casing for the same. Fig. 7 shows a constructional form in which the female cone is provided with lugs and lateral flanges, and internally with guide ribs for which latter the male cone has corresponding guide grooves. Fig. 8 illustrates the arrangement and the use of a locking washer according to this invention on a screw bolt. Fig. 9 illustrates a modification.

In the various figures the same reference letters are used to indicate similar parts.

As shown in Fig 1 the locking washer according to this invention consists of an outer or female cone $a$ and of an inner or male cone $b$. The operation of this locking washer will now first of all be explained with reference to Fig. 8 of the drawing. Assuming in this figure $m$ to be the resistance through which a screw bolt $k$ extends and which should be permanently connected with a plate or member $n$, the male cone $b$ which by preference consists of two parts is first of all placed upon the resistance $m$ so as to embrace the bolt $k$. The female cone $a$ is then slid over the bolt $k$ until it rests upon the top of the male cone $b$ after which the nut $l$ is screwed down upon the bolt. The descent of the nut $l$ causes the female cone $a$ to glide without rotation on the male cone $b$ whereby the two parts of the male cone are contracted yieldingly with gradually increasing pressure to a smaller diameter or, in other words, are firmly pressed against the adjacent faces of the bolt $k$ until after the final tightening of the nut $l$, the female cone $a$ firmly embraces the male cone $b$ and thereby secures a firm grip of the male cone on the bolt $k$. In the event of the male cone $b$ being provided with grips or teeth $c$ as shown in the various figures, these teeth are forced to penetrate or to bite into the adjacent surfaces of the bolt or its screw thread, thereby rendering the displacement or rotary movement of the cone impossible. As the male cone $b$ is made of elastic or resilient material its resiliency during the tightening of the nut is increased to such an extent that any shocks or vibrations, otherwise exerted upon the nut, are taken up by the locking washer, whereby any tendency of the nut to become loose or to unscrew itself, is completely avoided and the nut after being tightened is rendered directly operative as a locking nut, no counter-nut being required.

As shown in Fig. 5, a thin metal sheet washer or plate $e$ may be interposed between the female cone and the nut and the said thin plate may be provided with radial projections or lugs $e'$ which after the tightening of the nut $l$ are bent back into the path of the edges of the nut so as to assist in counteracting any tendency thereof to rotate. Fig. 6 represents the use of a casing $f$ consisting of thin sheet metal or the like and adapted to serve as a guide for the constituents $a$ and $b$ of the locking washer. This casing $f$ may likewise be provided with marginal teeth or lugs $f'$ which, after the descent of the female member $a$ or in the event of a nut being used for the depression of the latter, may be bent back so as to safeguard the position of the parts.

In the constructional form in Fig. 7 the female cone $a$ is provided with projections or lugs $i$ also shown in Fig. 8 at its upper end which after the screwing down of the nut may also be bent back into the path of the edges of the nut and in order to facilitate this manipulation these projections or lugs $i'$ may be provided with openings $i$ for the insertion of an appropriate bolt or the like. In this case moreover the female cone is provided on its conical inner face with guide ribs $g$ adapted to engage with corresponding guide grooves $h$ of the male cone $b$. Further the bottom parts of the female cone may be flared or provided with lateral flanges or enlargements $j$ so constructed as to fit, in operative position, over the male cone to completely surround and cover the latter against the outside.

In the modification shown in Fig. 9 the two cones are loosely connected together, so that the parts shall not become misplaced when not in use. For this purpose the male cone members $b$ are provided with lugs $b'$ which engage in corresponding notches or recesses $a'$ in the female cone $a$, space being allowed to provide for the relative vertical movement of the two cones when the nut is tightened.

What I claim and desire to secure by Letters Patent is:

1. In a locking washer the combination with a divided inner member having internal locking faces, of an outer member capable of moving on the said inner member without rotation to thereby cause the separate locking faces of the said inner member to be drawn toward each other, substantially as set forth.

2. In a locking washer the combination with an inner member comprising two separate cone sections having cylindrical locking faces, of an outer member capable of moving on the said inner member in rectilinear direction to thereby cause the said separate cone sections to be drawn together in a radial manner, substantially as described.

3. In a locking washer the combination of an inner member comprising two separate resilient cone sections having cylindrical locking faces, gripping means on the said locking faces, an outer member adapted to embrace and to glide without rotation on the said inner member and means for pressing the said outer member on to the said inner member to thereby cause the said separate cone sections to be drawn together radially substantially as described.

4. In a locking washer the combination of an inner member comprising two separate resilient cone sections having cylindrical locking faces, an outer member adapted to embrace and to glide without rotation on the said inner member, means on both members for mutual engagement and a nut for pressing the said outer member on to the said inner member to thereby cause the said separate cone sections to be drawn together radially, substantially as and for the purpose set forth.

5. In a locking washer the combination of an inner member comprising two separate resilient cone sections having cylindrical locking faces, an outer member adapted to embrace and to glide without rotation on the said inner member, and a casing supporting the said inner member and adapted to guide the said outer member on the said inner member all substantially as described.

6. In a locking washer the combination of an inner member comprising two separate resilient cone sections having cylindrical locking faces, an outer member adapted to embrace and to glide without rotation on the said inner member, a nut for pressing the said outer member on to the said inner member and projections on the said outer member adapted to act as stops to secure the said nut in position, all substantially as described.

In testimony whereof, I affix my signature in presence of two witnesses.

DANIEL PALMER JONES.

Witnesses:
C. P. LIDDON,
RIPLEY WILMER.

Copies of this patent may be obtained for five cents each, by addressing the "Commissioner of Patents, Washington, D. C."